US011681486B2

(12) United States Patent
Yasuda

(10) Patent No.: US 11,681,486 B2
(45) Date of Patent: Jun. 20, 2023

(54) INFORMATION PROCESSING APPARATUS, METHOD OF CONTROLLING THE SAME, AND RECORDING MEDIUM FOR SETTING A DEFAULT PRINTING APPARATUS

(71) Applicant: CANON KABUSHIKI KAISHA, Tokyo (JP)

(72) Inventor: Akihiro Yasuda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/157,748

(22) Filed: Jan. 25, 2021

(65) Prior Publication Data

US 2021/0240424 A1    Aug. 5, 2021

(30) Foreign Application Priority Data

Jan. 31, 2020  (JP) .............................. JP2020-015845

(51) Int. Cl.
*G06F 3/14* (2006.01)
*G06F 3/12* (2006.01)

(52) U.S. Cl.
CPC .......... *G06F 3/1292* (2013.01); *G06F 3/1203* (2013.01); *G06F 3/1231* (2013.01); *G06F 3/1232* (2013.01); *G06F 3/1237* (2013.01)

(58) Field of Classification Search
CPC .... G06F 3/1292; G06F 3/1203; G06F 3/1232; G06F 3/1237; G06F 3/1296
USPC .......... 358/1.15, 1.9, 1.13; 399/13; 709/226, 709/240, 242, 249
See application file for complete search history.

(56) References Cited

U.S. PATENT DOCUMENTS

| 2003/0011801 A1* | 1/2003 | Simpson ............... G06F 3/1204 358/1.15 |
| 2007/0168514 A1* | 7/2007 | Cocotis .............. H04N 1/00416 709/225 |
| 2011/0235115 A1* | 9/2011 | Nishio .................. G06F 3/1256 358/1.15 |
| 2017/0048405 A1* | 2/2017 | Park ...................... G06F 3/1228 |

FOREIGN PATENT DOCUMENTS

JP          2013-238924 A    11/2013

* cited by examiner

*Primary Examiner* — Jamares Q Washington
(74) *Attorney, Agent, or Firm* — Canon U.S.A., Inc. IP Division

(57) ABSTRACT

An information processing apparatus is configured to communicate with a server system with information about a first printing apparatus registered therein. The information processing apparatus includes an acquisition unit to acquire information about a first printing apparatus registered as a default printing apparatus in the server system, a storage unit to store information about a second printing apparatus to perform communication not using the server system, as information about the default printing apparatus to be used, a determination unit to determine which of the stored information about the second printing apparatus and the acquired information about the first printing apparatus is to be displayed as information about the default printing apparatus, and a display unit to display the information about the default printing apparatus based on a result of the determination by the determination unit.

12 Claims, 14 Drawing Sheets

FIG.5A

| DEVICE NAME | HWID | IP ADDRESS |
|---|---|---|
| iR-ADV CCCC | iR-ADV_CCCC61B1 | xxx.xxx.xxx.001 |
| iR-ADV XXXX | iR-ADV_XXXXD80D | xxx.xxx.xxx.111 |
| AAAA | AAAACF39 | xxx.xxx.xxx.222 |
| YYYY | YYYY62B5 | xxx.xxx.xxx.234 |

FIG.5B

| USER INFORMATION | DEFAULT PRINTER | PRINTER |
|---|---|---|
| Taro | iR-ADV CCCC | iR-ADV CCCC, iR-ADV XXXX, AAAA |
| Hanako | AAAA | iR-ADV XXXX, AAAA |
| Kenji | iR-ADV CCCC | iR-ADV CCCC |
| Rena | — | AAAA,YYYY |

FIG.5C

| DEVICE INFORMATION | LOCAL DEFAULT PRINTER | LOCAL PRINTER |
|---|---|---|
| CLIENT COMPUTER 100 | EEE | EEE, BBB, CCC, DDD |

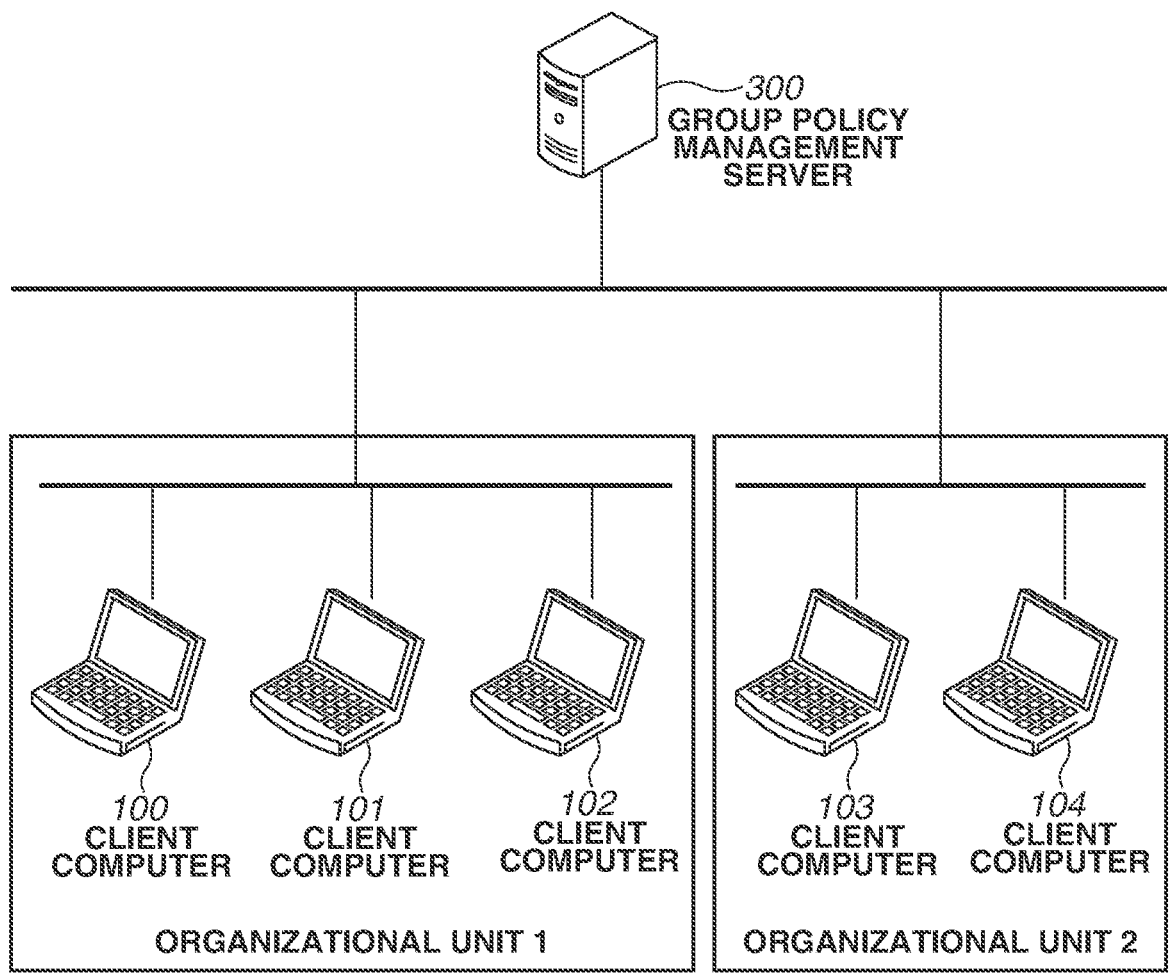

FIG.8

| PRIORITY | CONTENTS OF POLICY |
|---|---|
| 1 | SET DEFAULT OF CLOUD PRINT SERVICE TO DEFAULT OF CLIENT COMPUTER |
| 2 | SET LOCAL PRINTER TO DEFAULT OF CLIENT COMPUTER |

FIG. 10

| USER INFORMATION | DEFAULT PRINTER | PRINTER | PRIORITY GIVEN TO CLOUD |
|---|---|---|---|
| Taro | iR-ADV CCCC | iR-ADV CCCC, iR-ADV XXXX, AAAA | ON |
| Hanako | AAAA | iR-ADV XXXX, AAAA | ON |
| Kenji | iR-ADV CCCC | iR-ADV CCCC | OFF |
| Rena | — | AAAA, YYYY | OFF |

1000

INFORMATION PROCESSING APPARATUS, METHOD OF CONTROLLING THE SAME, AND RECORDING MEDIUM FOR SETTING A DEFAULT PRINTING APPARATUS

BACKGROUND

Field of the Disclosure

The present disclosure relates to information processing apparatuses, methods of controlling an information processing apparatus, and recording media.

Description of the Related Art

It is known that, when printing document data registered in a cloud service, the cloud service transmits print data to an image forming apparatus via a cloud print service provided with a print function. In such a printing system, the administrator registers the image forming apparatus in a group on the cloud print service. The administrator makes a setting about whether to permit a user belonging to the group with the registered image forming apparatus to use the image forming apparatus.

The user permitted to use the image forming apparatus based on the setting by the administrator inputs a print job from a client terminal to the cloud print service. Then, the cloud print service stores the received print job for management. Subsequently, the image forming apparatus displays print jobs managed by the cloud print service, acquires a print job selected by the user from the cloud print service, and outputs the print job (for example, Japanese Patent Application Laid-Open No. 2013-238924).

Typical examples of cloud print services include GoogleCloudPrint (registered trademark) (Japanese Patent Application Laid-Open No. 2013-238924), MicrosoftHybridCloudPrint (registered trademark), and uniFLOW Online (registered trademark).

In an operating system (OS), a frequently used printer can be registered as a default printer, as a function of the local print not using the above-described cloud print service. The use of this function enables the transmission of print data to the printer registered as the default even without specifying the printer to be used.

It is assumed that a printer frequently used by the user is set to the default printer from among a plurality of printers registered in the cloud print service. Once the user sets the default printer, a print screen can be displayed where the printer set to the default is automatically selected. When printing, the user does not need to select the printer to use from among the printers registered in the cloud print service.

When displaying a printer used for local print and a printer on the cloud print service as printers usable for printing, which printer used is to be displayed as the default printer is not clear. As a result, a print queue not intended by the user or the administrator can be displayed as the default.

SUMMARY

Embodiments of the present disclosure include an information processing apparatus to communicate with a server system with information about a first printing apparatus registered therein, the server system being configured to set the first printing apparatus as a default printing apparatus, the information processing apparatus including an acquisition unit configured to acquire information about the first printing apparatus registered as the default printing apparatus in the server system, a storage unit configured to store information about a second printing apparatus to perform communication not using the server system, as information about the default printing apparatus to be used, a determination unit configured to determine which of the information about the second printing apparatus stored in the storage unit and the information about the first printing apparatus acquired by the acquisition unit is to be displayed as information about the default printing apparatus, and a display unit configured to display the information about the default printing apparatus based on a result of the determination by the determination unit.

Further features of the present disclosure will become apparent from the following description of exemplary embodiments with reference to the attached drawings.

BRIEF DESCRIPTION OF THE DRAWINGS

FIGS. 5A to 5C illustrate examples of printer information databases stored in the cloud print service according to the first exemplary embodiment.

FIG. 7 illustrates an example of a network configuration for applying group policies according to the first exemplary embodiment.

FIG. 8 illustrates an example of a table for managing the priority of group policies according to the first exemplary embodiment.

FIG. 10 illustrates an example of a table for managing default settings according to a second exemplary embodiment.

DESCRIPTION OF THE EMBODIMENTS

Figure 1:
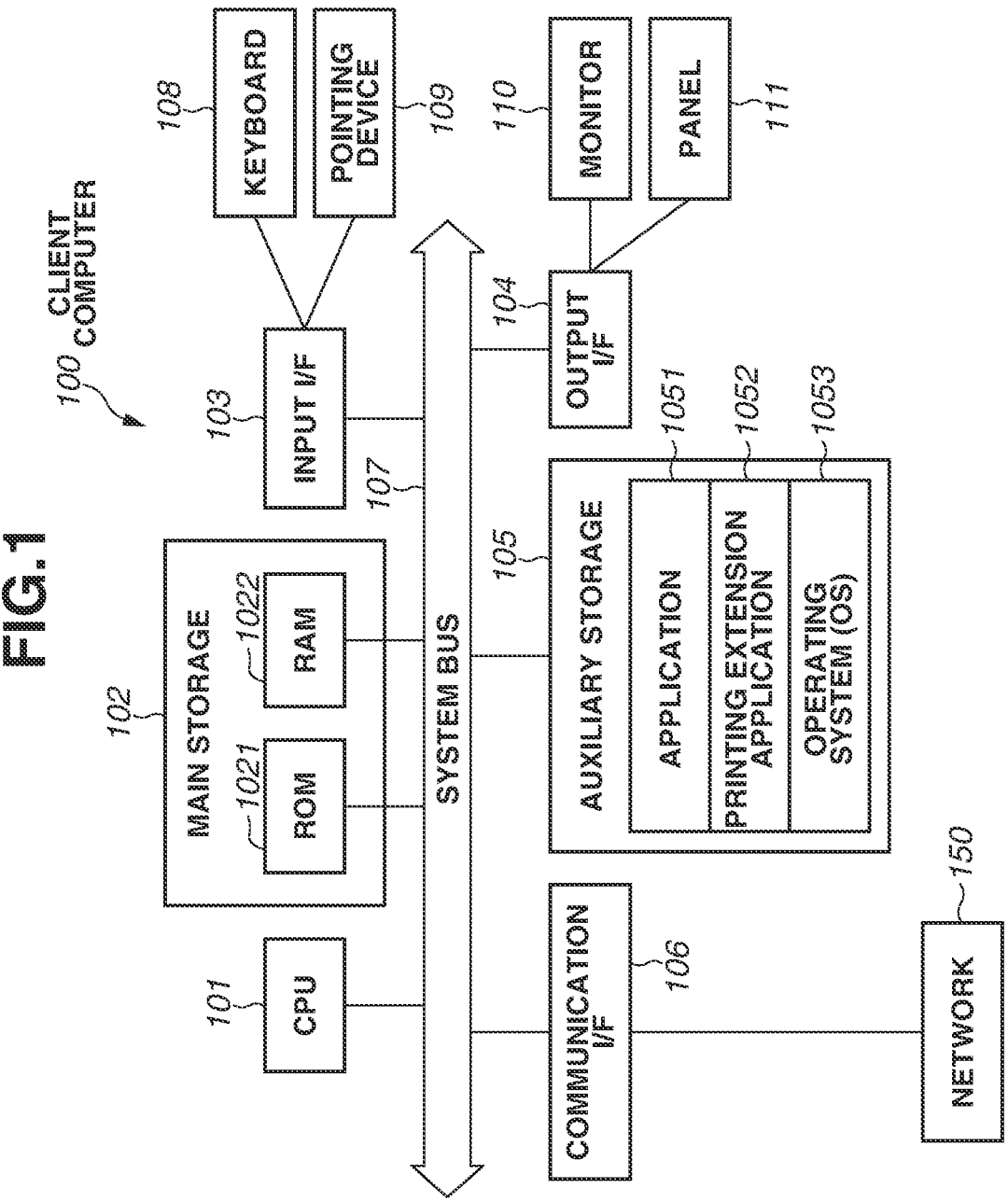
FIG. 1 illustrates an example of the hardware configuration of a client computer according to a first exemplary embodiment.

FIG. 1 illustrates the hardware configuration of a general computer (information processing apparatus) according to a first exemplary embodiment of the present disclosure. It goes without saying that, unless otherwise noted, embodiments of the present disclosure are applicable to a single function, a system including a plurality of apparatuses, and a system connected via a network to perform processing, as long as the functions of the present disclosure are implemented. A client computer 100 includes a printing system illustrated in FIG. 1. The following will describe the printing system in detail.

A central processing unit (CPU) 101 controls the entire apparatus by programs stored in a read only memory (ROM) 1021 or a random access memory (RAM) 1022 of a main storage 102, or in an auxiliary storage 105.

The RAM 1022 is also used as a work area when the CPU 101 performs various pieces of processing. The auxiliary storage 105 records an operating system (OS) 1053, an application 1051, and a print expansion application 1052. In the following descriptions, the main storage 102 and the auxiliary storage 105 are collectively referred to as a storage.

Input devices including a pointing device 109, represented by a mouse and a touch panel, and a keyboard 108 are connected via an input interface (I/F) 103 to one another. The input devices are used by the user to issue various instructions to a computer.

An output I/F 104 is an interface for outputting data to the outside, more specifically, to output to devices such as a monitor 110 and a panel 111.

The client computer 100 is connected to a printer 200 and each system through a network 150 via a communication I/F 106. A common data system bus 107 exchanges data between I/Fs and modules. In addition, processing in embodiments of the present disclosure is carried out by the CPU 101 based on programs stored in the storage.

Figure 2:
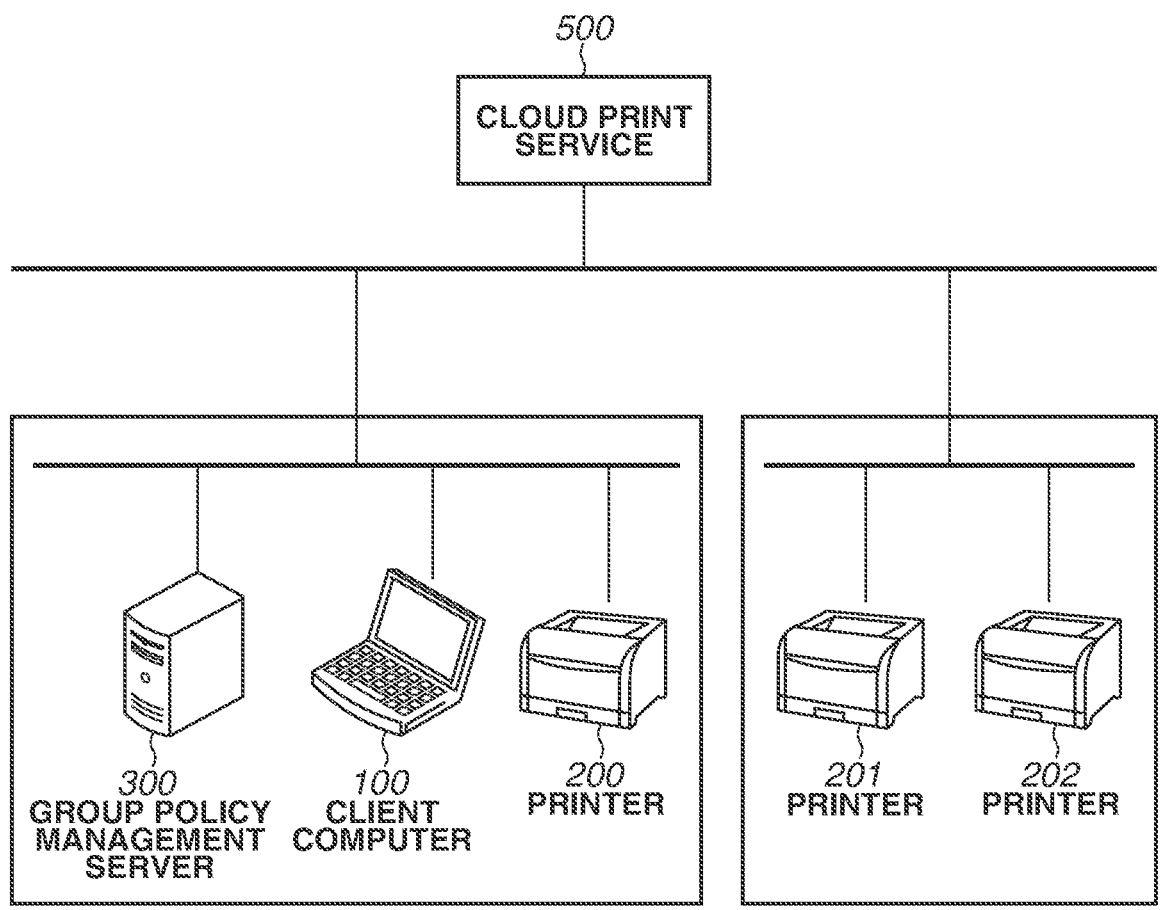
FIG. 2 illustrates an example of a network configuration according to the first exemplary embodiment.

FIG. 2 illustrates a network configuration as a simplified environment of the network 150 according to the exemplary embodiment of the present disclosure. The network 150 connected to the client computer 100 and the printer 200 is composed of a single intranet under a communicable condition. Printers 201 and 202 are connected to another intranet connected to the above-described intranet through the Internet. The network 150 is further connected to a cloud print service 500, which is communicable with the client computer 100 and the printers 200, 201, and 202 through the Internet.

The cloud print service 500 is a cloud print service on the Internet, more specifically, a cloud print service built on a cloud as a server system including a plurality of servers (i.e., the cloud print service built on a server system). According to the present exemplary embodiment, the cloud print service 500 is connectable to each intranet, and connected to the client computer 100 and the printers 200, 201, and 202. The cloud print service 500 is subjected to account management by using a user identification (ID) and a password. The user accesses the cloud print service 500 by using this account.

Figure 3:
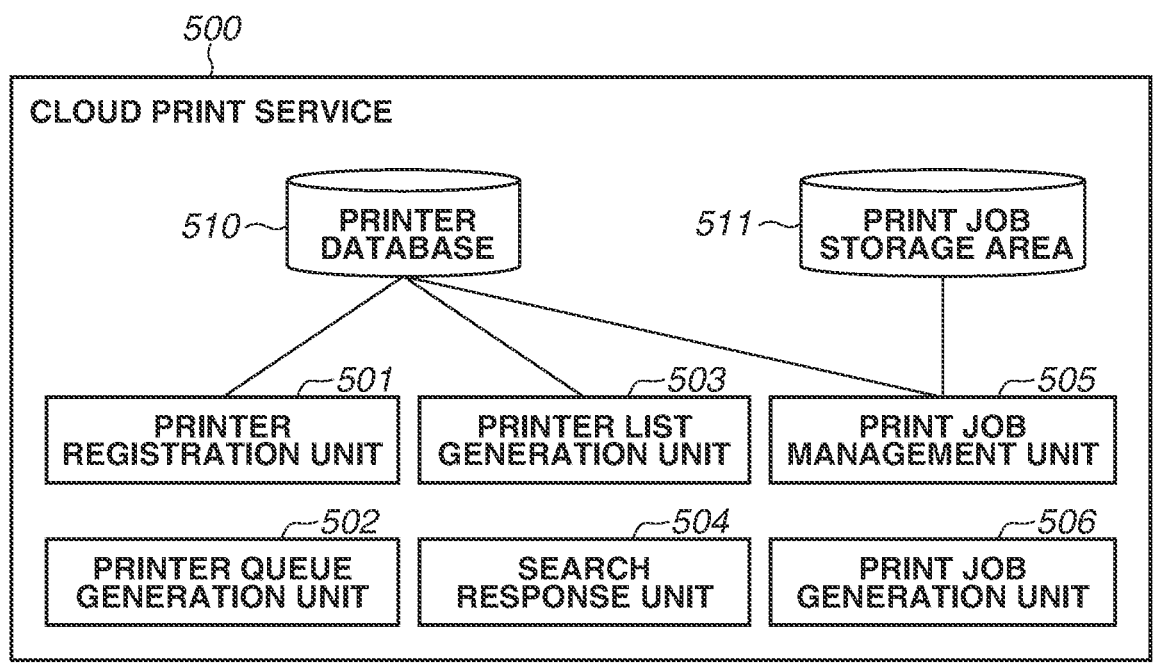
FIG. 3 illustrates an example of a function block of a cloud print service according to the first exemplary embodiment.

FIG. 3 is a function block diagram illustrating the cloud print service 500 according to an exemplary embodiment of the present disclosure.

The cloud print service 500 is a service existing on a cloud via the Internet, and offers printing-related functions. According to the present exemplary embodiment, the cloud print service 500 has functions of a printer registration unit 501, a print queue generation unit 502, a printer list generation unit 503, a search response unit 504, and a printer database 510. The cloud print service 500 also has functions of a print job management unit 505, a print job generation unit 506, and a print job storage area 511. These functions may be offered by other cloud print services in cooperation with the cloud print service 500.

Although the following will describe the printer 201 as an example, the functions also are available with the printer 200 and 202 connectable to the cloud print service 500 through similar processing.

In response to the printer registration unit 501 receiving a printer registration instruction from the printer 201, the printer registration unit 501 generates a print queue by using the print queue generation unit 502 and registers the generated print queue in the printer database 510 in association with the printer identification information. The state that the print queue of a printer and the printer identification information are registered in association with each other in this way is referred to "the printer is registered". Various attributes may be added to the registered printer. The attributes are, for example, the location of the printer and account information indicating who can access the registered printer.

The printer list generation unit 503 generates a list of registered printers.

The search response unit 504 transmits information about registered printers in response to an event of printer search of the cloud print service 500 from the client computer 100.

The print job management unit 505 receives a print job from the client computer 100 and then directly transmits the print job to the printer 201 depending on the situation. Alternatively, the print job management unit 505 once stores the print job in the print job storage area 511 and then transfers the print job to the print job generation unit 506 at a timing determined by the destination printer. Then, the print job generation unit 506 converts the print job into a suitable format and then transmits the print job.

A procedure for registering a printer in the cloud print service 500 will be described. The registration of a printer is performed by the administrator of the printer. The printer registered in the cloud print service 500 is disclosed to a user or group permitted to use the printer by the administrator. The user permitted to use the printer or a user belonging to the group permitted to use the printer can perform printing by using the printer registered by the administrator.

An example of registering the printer 200 in the cloud print service 500 will be described.

According to the present exemplary embodiment, the user accesses the printer 200 from the client computer 100 and transmits a request for registering the printer 200 in the cloud print service 500 by operating the printer 200.

The printer 200 supports a cloud print function (a function of receiving a print job from the cloud print service 500 and printing the print job) and a Web user interface (WebUI) function to operate the printer 200 from the client computer 100. The WebUI function is a function of generating a user interface (UI) and disclosing the UI on the network. The client computer 100 supports a cloud print client function (a function of transmitting a file to the cloud print service 500) and a WebUI client (e.g., a web browser) for operating a WebUI. The cloud print service 500 represents a cloud print service on the Internet.

Firstly, the user opens a WebUI of the printer 200 by using the WebUI client of the client computer 100, and, on the WebUI, selects a button for registering a printer in the cloud print service 500.

The printer 200 transmits a printer registration request to the cloud print service 500 together with an access token of the user as the administrator.

If the cloud print service 500 performs authentication by using the acquired access token and the authentication is successful, the printer information is registered in the cloud print service 500. For example, the printer information includes the printer name, the Hardware Identification (HWID) indicating printer model information, and the Internet Protocol (IP) address.

The above-described operation completes the registration of a printer in the cloud print service 500.

A method performed by the administrator to manage printers of the cloud print service 500 will be described. In the printer management, for example, users and groups are set per printer registered in the cloud print service 500 for them to use the printer, and a default printer can be set from among the registered printers. The default printer refers to a printer set first on a print setting screen when printing is performed by using the cloud print service 500. The default printer also refers to a printer used when printing is performed without displaying the print setting screen.

The user as the administrator accesses the cloud print service 500 and then logs into the cloud print service 500 by using an account with the printer management authority. Then, the user displays a registered printer list.

The administrator selects a group subjected to default printer setting from among the groups managed by the administrator.

The cloud print service 500 displays a list of printers that can be used by the selected group. The user sets a default printer for the group on the displayed printer list.

In the above-described method, the default printer is set by the user with the printer management authority of the users of the cloud print service 500. Even a user without the printer management authority may be able to set the default printer used by the user.

FIG. 5A illustrates an example of the printer database 510 storing information about printers held by the cloud print service 500. Device Name refers to printer names (device name), which contains the printer name acquired from the printer 201 at the time of registration. HWID refers to identifiers for identifying models, which contains the model of the printer 201 (a model-specific identifier, i.e., identification information specific to the image forming apparatus). IP Address refers to IP addresses, which contains the IP address of the printer 201 as the connection destination.

FIG. 5B illustrates a database representing the association between the user information and the corresponding printer information managed by the cloud print service 500.

User Information is information stored to identify each registered user, e.g., the user name and user ID. Default Printer is information stored to identify a default printer set by the cloud print service 500. Examples of information for identifying a printer include the device name and the device serial number. Under Default Printer, default printers are registered only when administrators or users set the default printers. In FIG. 5B, for example, "Taro" has "iR-ADV_CCC61B1" set to the default printer. Meanwhile, "Rena" does not set any default printer and the Default Printer cell is blank.

Printer indicates printers registered in the cloud print service 500 by each user, and permitted to be used by each user. "Taro" can use "iR-ADVCCCC", "iR-ADVXXXX", and "AAAA". Meanwhile, "Hanako" can use "iR-ADVXXXX" and "AAAA".

Upon reception of a request to acquire information about registered printers from the client computer 100, the cloud print service 500 references the table illustrated in FIG. 5B. Then, the cloud print service 500 acquires the information about the user logging into the client computer 100 and the default printer information and printer information corresponding to the user, and transfers the printer information to the client computer 100 as a response.

On the other hand, default printers used to perform printing can be set even on the client computer 100 without using the cloud print service 500.

A user registers a printer to be set to the default printer, from among printers with which the client computer 100 can communicate not using the cloud print service 500. Referring to the table illustrated in FIG. 5C, Device Information is information stored to identify client computers. Local Default Printer is identification information stored about printers used for printing not using the cloud print service 500. Local Printer indicates printers with which the client computer 100 can perform printing without using the server system.

If the user registers the default printer in the information in FIG. 5C, the information is stored in the storage of the client computer 100. Although, in the present exemplary embodiment, a default printer is set for each client computer, the processing is not limited thereto. A default printer may be set for each user logging into the client computer 100.

The client computer 100, which performs both printing via the cloud print service 500 and printing without it, has both a default printer on the cloud print service 500 and a local default printer available. Depending on the user's environment, the user may display the local default printer as the default or display the default printer on the cloud print service 500 as the default. According to the present exemplary embodiment, the administrator sets the group policy of the printer to be displayed as the default printer to display a suitable printer as the default.

The network environment for managing the default printer setting for each group will be described with reference to FIG. 7.

FIG. 7 illustrates a network configuration of the group policy management server 300 and client computers to which group policies are applied. A group policy refers to an ActiveDirectory (registered trademark) scheme for integrally managing settings for users and computers. This function is an OS function available to make settings common to computers and users handled in a company for the purpose of enhancing security and enabling or disabling Windows (registered trademark) functions. In the present exemplary embodiment of the present disclosure, a group policy provided by Microsoft Corporation will be described as an example. However, this does not mean a limit to execution. Terminals and users may be managed and limited by OS and application functions.

The group policy management server 300 is connected to client computer groups via a network. An Organizational Unit (OU) refers to a group to which a group policy is applied. The administrator (not illustrated) of a client computer group assigns group policies to individual OUs to manage the client computer group.

The administrator logs into a client computer by using an account with the authority of editing a group policy. The administrator accesses the group policy management server 300 from the client computer and sets a group policy to each OU.

According to the present exemplary embodiment of the present disclosure, two different OUs exist in the group policy management server 300, and different group policies between the OUs are applicable. The client computers 100, 101, and 102 belong to an OU 1, and the client computers 103 and 104 belong to an OU 2. Group policies can be assigned to a OU and priorities are given to group policies. In the present exemplary embodiment, the determination of the default printer is managed by using the group policy.

The following will describe the configuration of OUs according to the present exemplary embodiment of the present disclosure. Two different group policies are applied to the OU 1. As described above, in the OUs, a plurality of group policies and their priorities can be applied to computers and users. The following two priorities are applied here. With a first group policy with the higher priority, a default printer for cloud print is set to the default of the client computer. With a second group policy with the lower priority, a default printer for local print is set to the default printer of the client computer.

FIG. 8 illustrates the group policies of the OU 1 stored in the group policy management server 300. The following describes only group policies that are applicable to one OU and related to default printer settings. Priority indicates the priority of each policy. The smaller number indicates the higher priority than the other number. Contents of Policy indicates the contents of the set policy. In the table illustrated in FIG. 8, if a default printer is set on the cloud print service 500, the setting of the cloud print service 500 is displayed according to the priority. If no default printer on the cloud print service 500 is set, a local default printer is displayed as the default printer of a client computer.

According to the present exemplary embodiment, processing performed by the client computer to display a list of printers that can be used for printing will be described with reference to FIG. 4.

Figure 4:
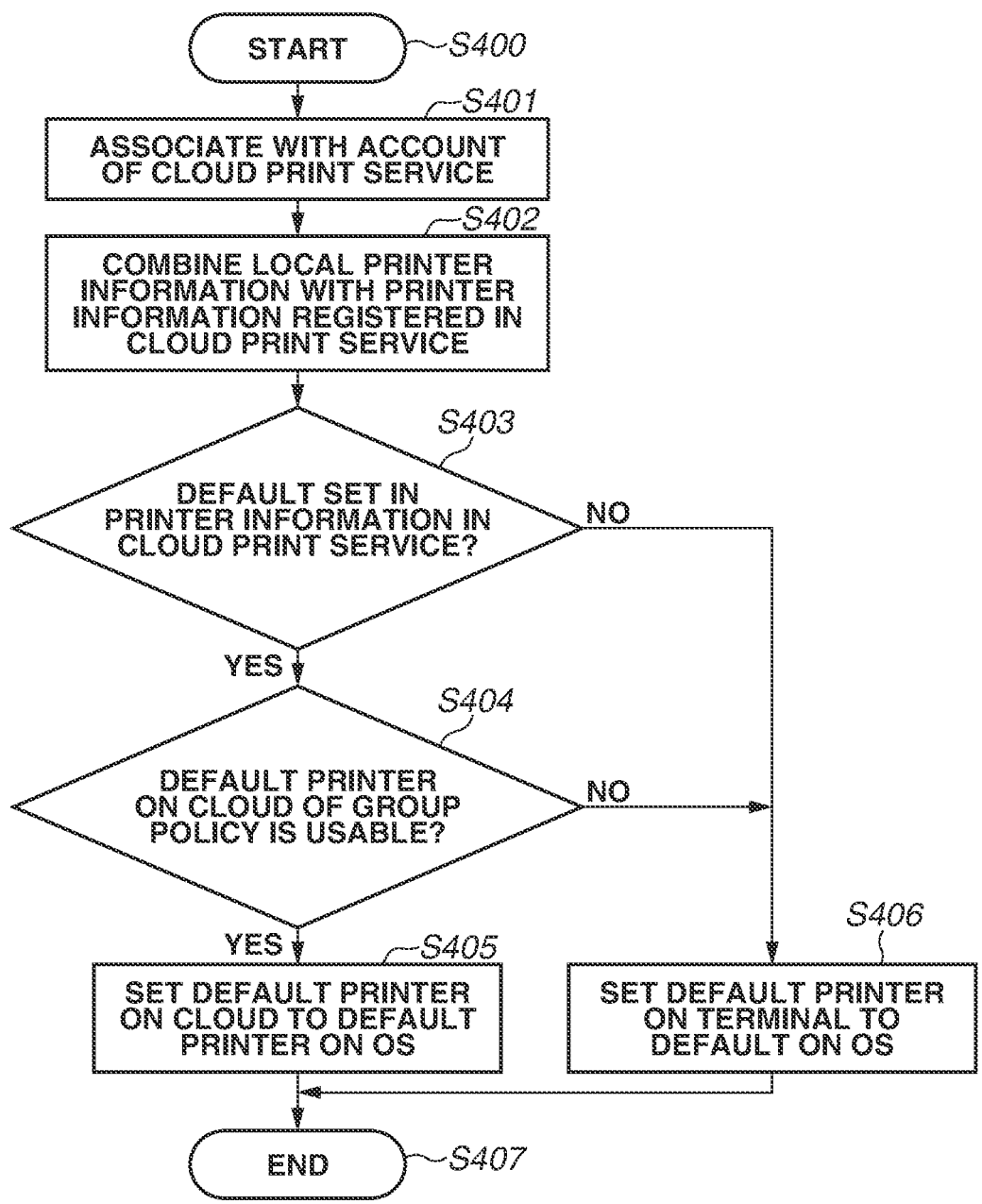
FIG. 4 is a flowchart illustrating processing of registering a default printer registered in the cloud print service on a client computer according to the first exemplary embodiment.

The processing illustrated in FIG. 4 is started in response to the user's operation to display a list of printers that can be used by the client computer 100. The processing will be described with reference to the flowchart illustrated in FIG. 4. The processing of this flowchart is performed by the OS running a corresponding program.

The user logs into the client computer 100 by using the account registered in the printer database 510 of the cloud print service 500. In step S400, the processing of this flowchart is started with the user's login to the client computer 100 by using the account of the cloud print service 500.

In step S401, an OS 1053 associates the account of the cloud print service 500 with the OS 1053. After completion of the association of the account, the OS 1053 acquires information about locally generated print queues and displays the information in the monitor 110. In this case, Taro logs into the client computer 100 based on the table illustrated in FIG. 5B. The OS 1053 refers to the table illustrated in FIG. 5C and acquires information about the print queues of the four printers "BBB", "CCC", "DDD", and "EEE".

Figure 6A:
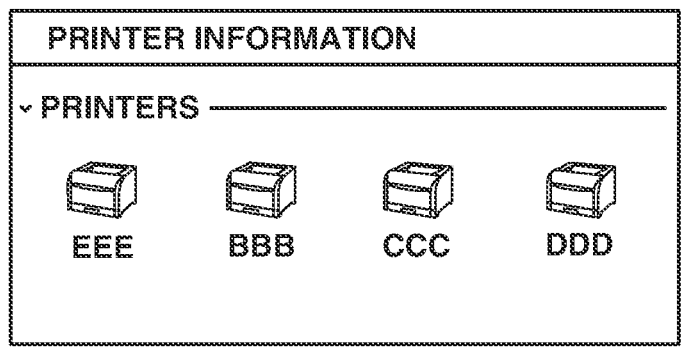
FIGS. 6A to 6C illustrate examples of printer lists on the client computer according to the first exemplary embodiment.
Figure 6B:
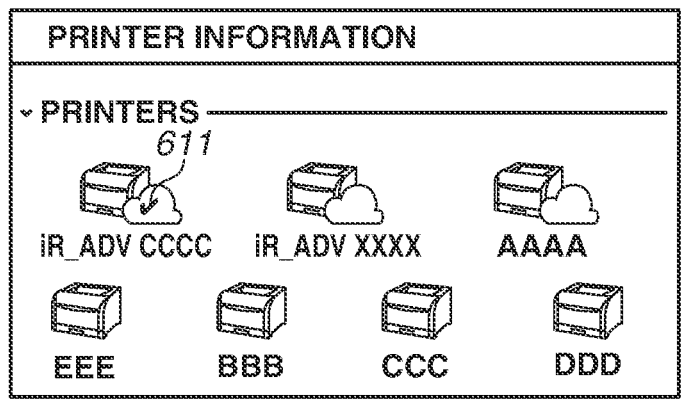

In step S402, the OS 1053 acquires printer information from the cloud print service 500 and combines the acquired printer information with the printer information stored in the local OS. The upper area illustrated in FIG. 6B indicates the printer information acquired from the cloud print service 500, i.e., the printer information stored in association with Taro in the table illustrated in FIG. 5B. FIG. 6B illustrates the printer information corresponding to the print queues on the cloud and the locally generated print queues. Combining the two pieces of printer information enables the OS 1053 to handle the printer information registered in the cloud print service 500 and the printer information locally registered in the client computer 100 in a collective way.

In step S403, the OS 1053 checks whether a default printer is registered in the login information in the cloud print service 500. If no default printer is registered (NO in step S403), the processing proceeds to step S406.

In step S406, the OS 1053 registers the default printer registered in the terminal, or the client computer 100 as the default on the OS 1053 according to the group policy with the lower priority (described above). Then, the processing proceeds to step S407. If no default printer is registered in the cloud print service 500, there is no printer that satisfies the group policy with Priority 1 in the group policies illustrated in FIG. 8. The OS 1053 therefore sets a default printer according to the group policy of Priority 2. The OS 1053 sets the printer "EEE" to the default with reference to the table illustrated in FIG. 5C. If there is no local printer, the OS 1053 sets a printer registered in the cloud print service 500 to the default printer.

If a default printer is registered in the cloud print service 500 (YES in step S403), the processing proceeds to step S404.

In step S404, the OS 1053 checks whether the setting for handling the default printer registered in the cloud print service 500 as the default printer of the OS 1053 is enabled according to the group policy. The OS 1053 makes an inquiry to the cloud print service 500 about whether the login user has set the default printer. The cloud print service 500 refers to the table illustrated in FIG. 5B to determine whether the default printer corresponding to the user logging into the client computer is registered. If the default printer is set, the cloud print service 500 returns the identification information on the default printer to the client computer. If no default printer is registered, the cloud print service 500 notifies the client computer that no default printer is registered. When the client computer receives the identification information on the default printer from the cloud printer (YES in step S404), the processing proceeds to step S405. If the client computer receives a notification indicating no default printer is registered from the cloud print service 500 (NO in step S404), the processing proceeds to step S406.

For example, in step S404, the OS 1053 determines whether the group policy for setting the default printer registered in the cloud print service 500 to the default printer is given higher priority than the group policy for setting the local printer to the default printer. The OS 1053 refers to the table illustrated in FIG. 8 to determine whether the group policy for setting the cloud printer to the default is given higher priority than the group policy for setting the local printer to the default. If the group policy for setting the default of the cloud print service 500 to the default printer of the client computer is given higher priority (YES in step S404), the processing proceeds to step S405. If the group policy for setting the default of the local print service to the default of the client computer is given higher priority (NO in step S404), processing proceeds to step S406.

In step S405, the OS 1053 acquires the default printer information registered in the cloud print service 500 and sets the printer to the default printer of the client computer. In step S405, if the identification information about the default printer acquired from the cloud print service 500 is "iR-ADVCCCC", the OS 1053 displays an object 611 illustrated in FIG. 6B, indicating which printer is the default printer.

In step S407, the processing of the flowchart ends. As described above, the OS 1053 determines which of the default printer of the cloud print service 500 and the local default printer is to be used as the default of the client computer. Then, based on the result of the determination, the OS 1053 sets either the default printer of the cloud print service 500 or the local default printer to the default printer.

In the above-described flowchart, in step S402, the OS 1053 acquires the printer information registered in the cloud print service 500. If the OS 1053 cannot communicate with the cloud print service 500 or acquire the printer information from the cloud print service 500 in step S402, the processing proceeds to step S406. Then, the OS 1053 uses the printer locally set to the default as the default printer of the client computer.

Figure 6C:
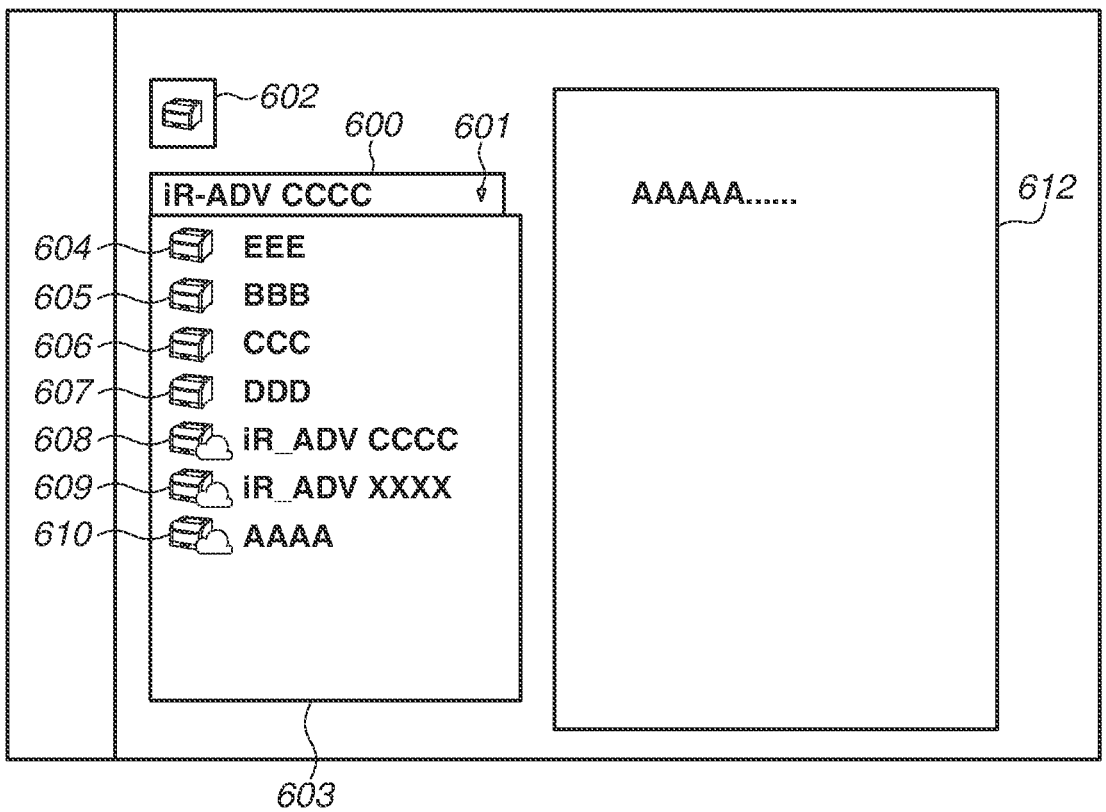

Referring to the flowchart illustrated in FIG. 4, the OS 1053 starts the processing if the user issues an instruction to display a list of printers that can be used for printing. If the OS 1053 issues a print instruction from an application such as a document creation application or a presentation document creation application, the OS 1053 may perform the above-described processing to display a print setting screen in which the user has selected the printer determined in the processing illustrated in FIG. 4. FIG. 6C illustrates an example of the print setting screen displayed when the user issues a print instruction on an application. An area 600 displays the identification information about the selected printer. On the display of the print setting screen, the identification information about the printer set to the default of the client computer by the processing illustrated in FIG. 4 is displayed. A button 601 is used to display a list of printers. If the user selects the button 601, an area 603 is displayed. The area 603 displays the identification information about local printers and the identification information about printers registered in the cloud print service 500 in a list form. Areas 604 to 607 display pieces of identification information about the local printers. Areas 608 to 610 display pieces of information about the printers registered in the cloud print service 500. If the user selects the button 601 again, the area 603 is hidden, the number of print copies, the page to be printed, the color mode, and other print settings can be made. A button 602 is used to specify the start of printing. If the user selects the button 602, print data is sent to the printer identified by the identification information displayed in the area 600. If the printer displayed in the area 600 is a printer registered in the cloud print service 500, the print data is sent to the print queue of the printer on the cloud print service 500. An area 612 displays the preview image of image data to be printed.

A case where a default setting is changed on the client computer 100 will be described.

The administrator with the printer information management authority operates the client computer 100 to display a list of the printer information illustrated in FIG. 6B and change default settings.

Figure 9:
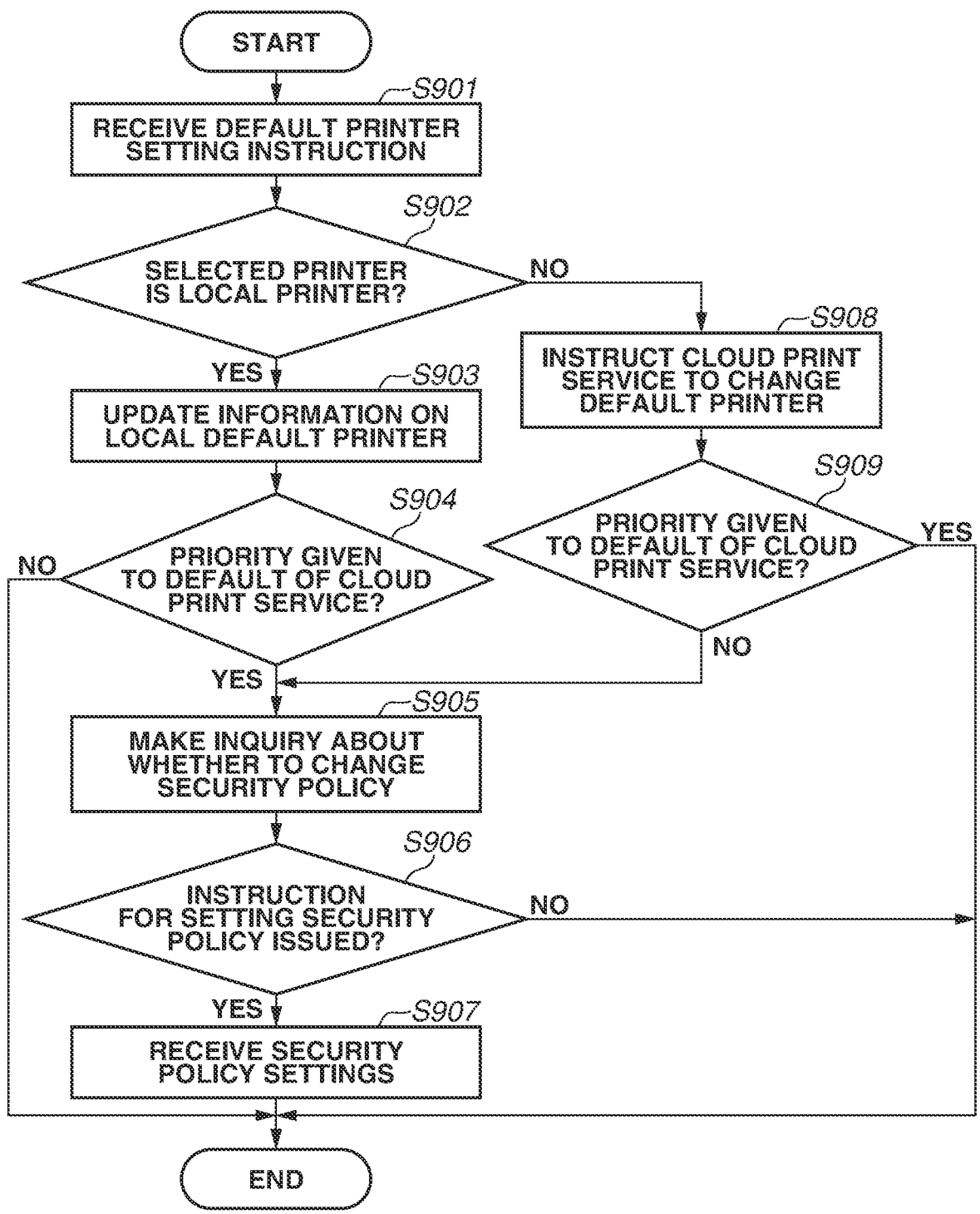
FIG. 9 is a flowchart illustrating processing performed by the client computer to change a default printer setting according to the first exemplary embodiment.

FIG. 9 is a flowchart illustrating processing performed by the client computer to change the default printer. The processing in this flowchart is implemented by the CPU 101 of the client computer running a corresponding program.

In step S901, the OS 1053 receives a default printer setting instruction. For example, in the screen illustrated in FIG. 6B, the user right-clicks on the icon associated with the identification information about the printer to be set to the default, and then selects "Settings For Default Printer" on the menu displayed by the right-click. The menu may be displayed by holding down the icon instead of right-clicking, the user selecting "Settings For Default Printer". The administrator sets which OU includes the default printer to be changed.

In step S902, the OS 1053 determines whether the selected printer is a local printer. If the selected printer is a local printer (YES in step S902), the processing proceeds to step S903. Otherwise (NO in step S902), the processing proceeds to step S908.

In step S903, the OS 1053 updates the local default printer in the table illustrated in FIG. 5C to the identification information about the selected printer. The OS 1053 refers to the group policy of the OU where a default printer change instruction is issued. In step S904, the user determines whether the setting is made that allows higher priority to be given to the group policy for setting the default of the cloud print service 500 to the default of the client computer than to the default of the local printer. If the group policy for setting the default of the cloud print service 500 to the default printer of the client computer is given higher priority than the group policy for setting the default of the local printer to the default of the client computer (YES in step S904), the processing proceeds to step S905. If the setting is made that allows higher priority to be given to the default of the local printer than to the default of the cloud print service 500 (NO in step S904), the processing of the flowchart illustrated in FIG. 9 ends.

In step S905, the OS 1053 displays a notification for making an inquire about whether to change the security policy. This is because that, if the setting is made that allows priority to be given to the default of the cloud print service 500, the printer displayed as the default remains unchanged even if the default printer is set to the local printer. In step S906, the OS 1053 determines whether a security policy change instruction has been issued. If a security policy change instruction has been issued (YES in step S906), the processing proceeds to step S907. In step S907, the OS 1053 displays a security policy setting screen to receive a setting change. Otherwise (NO in step S906), the processing of the flowchart illustrated in FIG. 9 ends.

If the printer set to the default printer is not a local printer (NO in step S902), the printer set to the default is a printer registered in the cloud print service 500. Then, the processing proceeds to step S908. In step S908, the OS 1053 instructs the cloud print service 500 to set the printer as the default printer in association with the printer identification information. The OS 1053 notifies the cloud print service 500 of which OU includes the default printer to be changed. The cloud print service 500 updates the information about the default printer of the user belonging to the OU notified of from the client computer.

In step S909, the OS 1053 determines whether, according to the group policy, the setting is made that allows higher priority to be given to the default of the cloud print service 500 than to the default of the local printer. If the setting is made that allows priority to be given to the default of the cloud print service 500 (YES in step S909), the processing of the flowchart illustrated in FIG. 9 ends. Otherwise (NO in step S909), the processing proceeds to step S905 and the subsequent steps.

This processing enables the display of a suitable printer on the display unit of the client computer even if the default printer is changed on the client computer.

In addition, a default printer from among the printers registered in the cloud print service 500 can be set not only by using the screen illustrated in FIG. 6B but also by accessing the cloud print service 500 by using the web browser function of the client computer.

The above-described processing enables the correct setting of a default printer on the OS 1053 to avoid both a local printer of the client computer and a default printer registered in the cloud print service 500 set on the OS.

A second exemplary embodiment will be described. In the above-described exemplary embodiment, the administrator displays the default printer based on the setting about whether to display the default printer registered in the cloud print service 500 as the default printer of the OS according to the group policy.

According to the second exemplary embodiment, a user is allowed to set, on the cloud print service 500, whether to give priority to a default printer set on the cloud print service

500 to use. Although, in the first exemplary embodiment, the administrator sets a default printer in each OU, a default printer can be set for each user.

The user logs into the cloud print service 500. The user selects a printer to be used as the default from among the printers that can be used on the cloud print service 500. Further, the user makes a setting about whether to give higher priority to the default printer of the cloud print service 500 than to the local default printer. If the setting is made that allows the cloud print service 500 to be used according to the priority, the default printer registered in the cloud print service 500 is displayed as the default printer regardless of which client computer is used by the user.

According to the second exemplary embodiment, the table illustrated in FIG. 10 is registered in the cloud print service 500. The table illustrated in FIG. 10 is similar to the table illustrated in FIG. 5B according to the first exemplary embodiment. According to the second exemplary embodiment, a flag 1000 indicating whether to give priority to the default of the cloud print service 500 is stored in addition to the table illustrated in FIG. 5B. Referring to FIG. 10, Taro gives priority to the default printer of the cloud print service 500, but Kenji does not. According to the second exemplary embodiment, the cloud print service 500 makes a setting about whether to set the default printer set on the cloud print service 500 to the default of the client computer. The cloud print service 500 may make a setting on the client computer about whether to use the default printer of the cloud print service 500. In this case, the client computer stores, for each user, information indicating whether to set the default printer of the cloud print service 500 to the default printer of the client computer.

Figure 11:
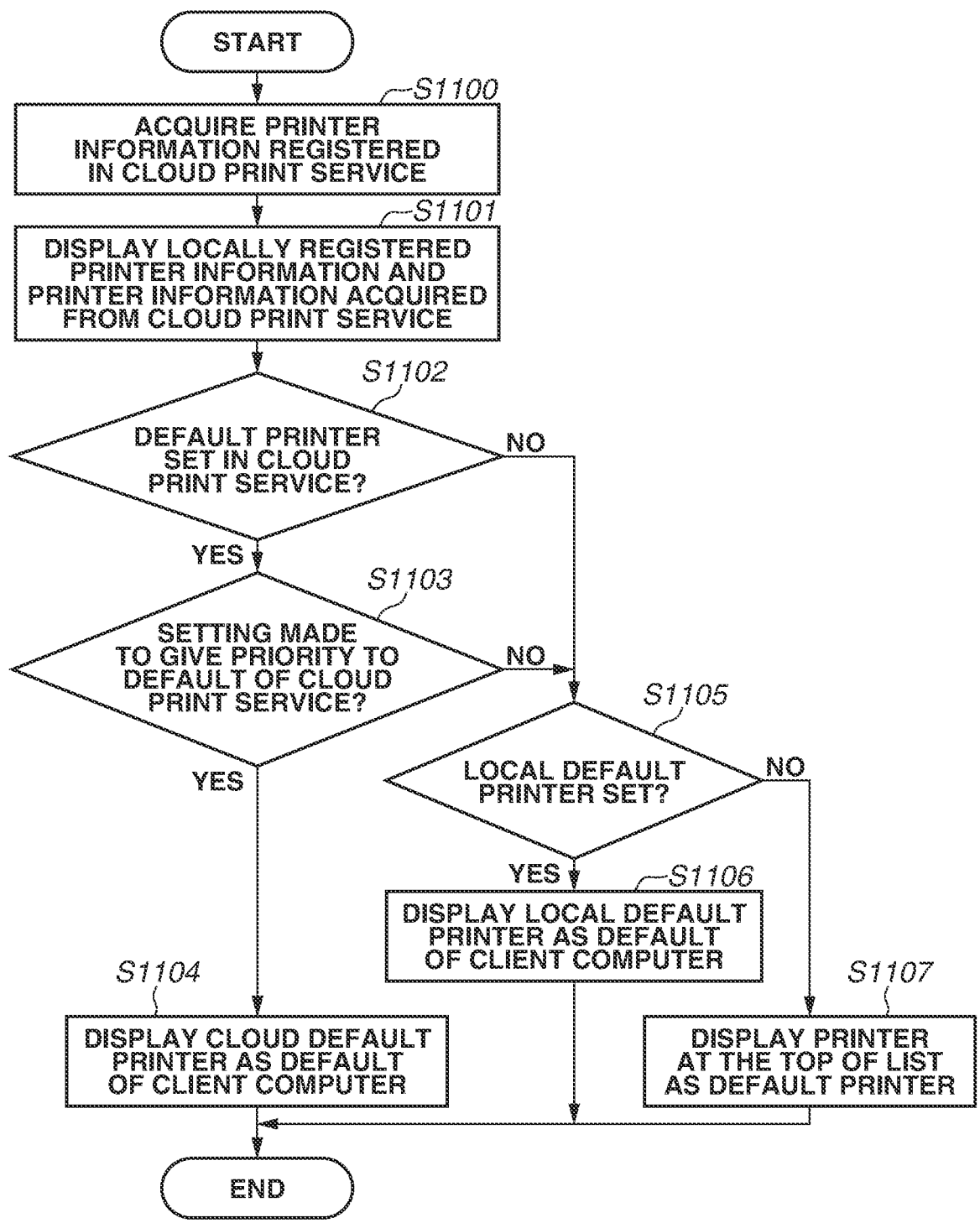
FIG. 11 is a flowchart illustrating processing of applying the default printer setting according to the second exemplary embodiment.

Processing of the client computer according to the second exemplary embodiment will be described with reference to FIG. 11. The processing illustrated in FIG. 11 is implemented by the CPU 101 running a corresponding program in response to the user issuing a printer list display instruction.

In step S1100, the OS 1053 acquires the information about the printers registered in the cloud print service 500 from the cloud print service 500. If the access token to the cloud print service 500 associated with the login user is stored in the client computer, the OS 1053 accesses the cloud print service 500 by using the access token. If the access token to the cloud print service 500 does not exist, the OS 1053 displays a login screen of the cloud print service 500 on the monitor, and performs the login processing to the cloud print service 500 to acquire an access token.

In step S1101, the OS 1053 integrates the printer information acquired from the cloud print service 500 with the local printer information stored in the storage, and displays the integrated information in a list of printers. Thus, as in the screen illustrated in FIG. 6B, the local printers and the cloud printers can be displayed in one screen.

In step S1102, the OS 1053 determines whether a default printer is set on the cloud print service 500. If a default printer is set (YES in step S1102), the processing proceeds to step S1103. If no default printer is set (NO in step S1102), the processing proceeds to step S1105.

In step S1103, the OS 1053 determines whether the setting to the login user is made that allows priority to be given to the default of the cloud print service 500. The OS 1053 refers to the table 1000 illustrated in FIG. 10 to determine whether to set the default printer of the cloud print service 500 to the default of the client computer.

In step S1104, the OS 1053 displays the printer set to the default printer as the default on the cloud print service 500. The OS 1053 displays an object 611 indicating the default printer illustrated in FIG. 6B.

In step S1105, the OS 1053 determines whether a local default printer is set. If a local default printer is set (YES in step S1105), the processing proceeds to step S1106. If not (NO in step S1105), the processing proceeds to step S1107.

In step S1106, the OS 1053 displays the local default printer as the default of the client computer. The OS 1053 additionally displays the object 611 illustrated in FIG. 6B as the local default printer. In step S1107, the OS 1053 displays a printer as the default in the list of printer information generated in step S1101. The printer displayed at the time refers to the printer information about the printer of which a print queue was generated on the oldest or latest date, or the first printer of the printers sorted in ascending or descending order of name.

Figure 12:
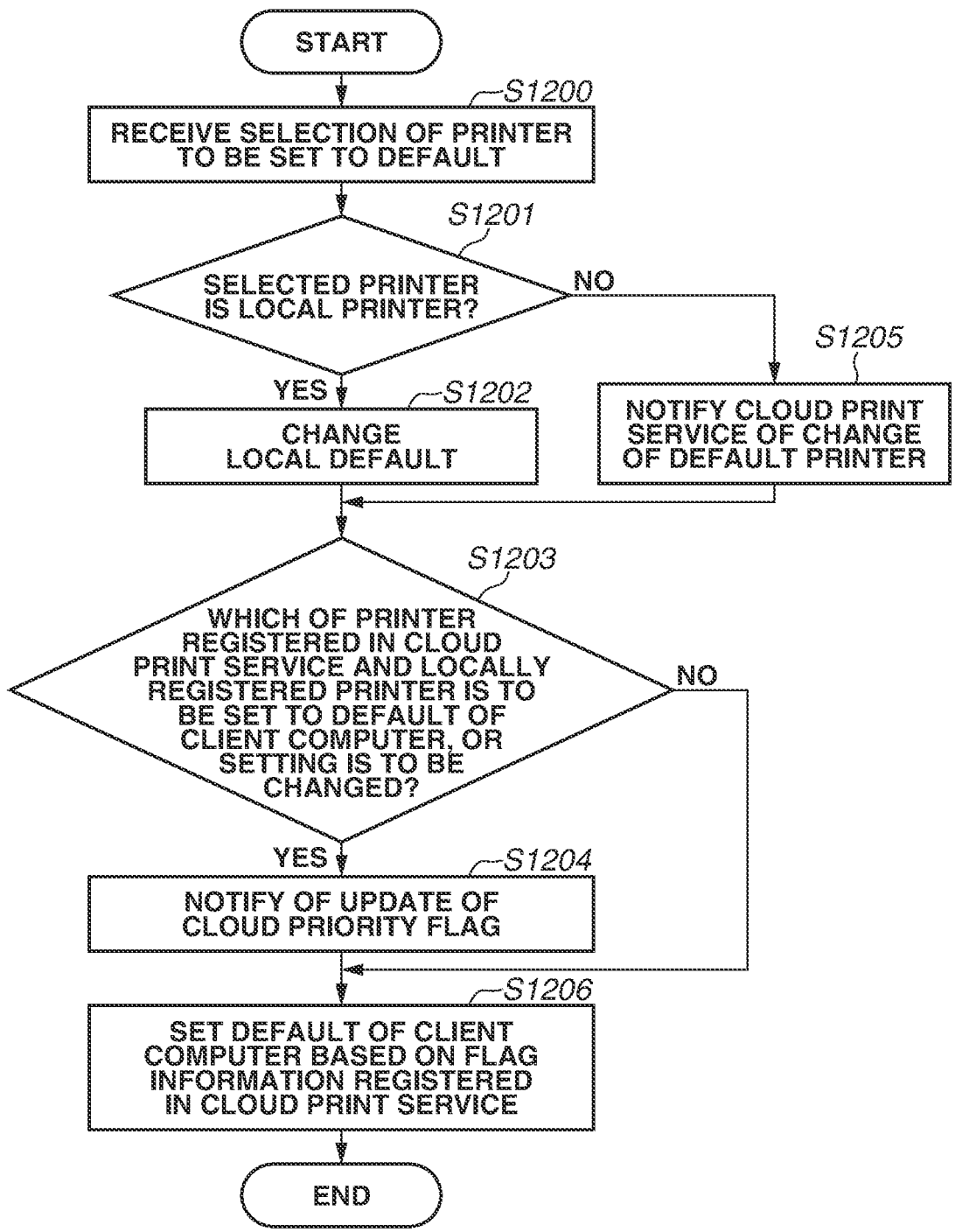
FIG. 12 is a flowchart illustrating an example of processing of changing the default printer setting according to the second exemplary embodiment.

Processing of changing the default printer according to the second exemplary embodiment will be described. The user operation for setting a default printer is similar to the user operation according to the first exemplary embodiment. Processing illustrated in FIG. 12 is implemented by the CPU 101 of the client computer running a corresponding program.

In step S1200, the OS 1053 receives a selection of a printer to be set to the default. In step S1201, the OS 1053 determines whether the selected printer is a local printer. If the selected printer is a local printer (YES in step S1201), the processing proceeds to step S1202. In step S1202, the OS 1053 updates the information about the default printer in the table illustrated in FIG. 5C. In step S1203, the OS 1053 makes an inquiry to the user about whether to change the setting about which of the printer registered in the cloud print service 500 and the locally registered printer is to be set to the default of the client computer. If the setting is not to be changed (NO in step S1203), the processing proceeds to step S1206. If an instruction to change the setting is issued (YES in step S1203), the processing proceeds to step S1204. In step S1204, the OS 1053 notifies the user of the update of the cloud priority flag of the cloud print service 500 according to the setting by the user. In step S1206, the OS 1053 sets the default printer of the client computer based on the current cloud priority flag information registered in the cloud print service 500, and then displays the default printer. Thus, after the user changes the setting of the default printer, the user can confirm the information about the printer displayed as the default in the client computer.

If the device selected is not a local printer (NO in step S1201), the processing proceeds to step S1205. In step S1205, the OS 1053 accesses the cloud print service 500 and notifies the user of the change of the default printer of the login user. The cloud print service 500 updates the information about the default printer of the cloud print service 500 based on the notification acquired from the client computer.

The above-mentioned processing is a method of updating the default printer according to the second exemplary embodiment.

As described above, which of the default printer of the cloud print service 500 and the local default printer is to be displayed as the default printer of the client terminal can be changed for each user.

A third exemplary embodiment will be described. According to the first and the second exemplary embodiments, information about a printer to be used for printing not using the cloud print service 500 has been registered in the client computer preliminarily. A portable client terminal such as a mobile terminal is not necessarily constantly connected to the same printer. According to the first and the second exemplary embodiments, no local default printer may be set. In the third exemplary embodiment, the following will describe the display of a default printer on a client terminal provided with no setting of a local default printer. The hardware configuration of the client terminal according to the third exemplary embodiment is similar to that of the client computer illustrated in FIG. 1.

Figure 13:
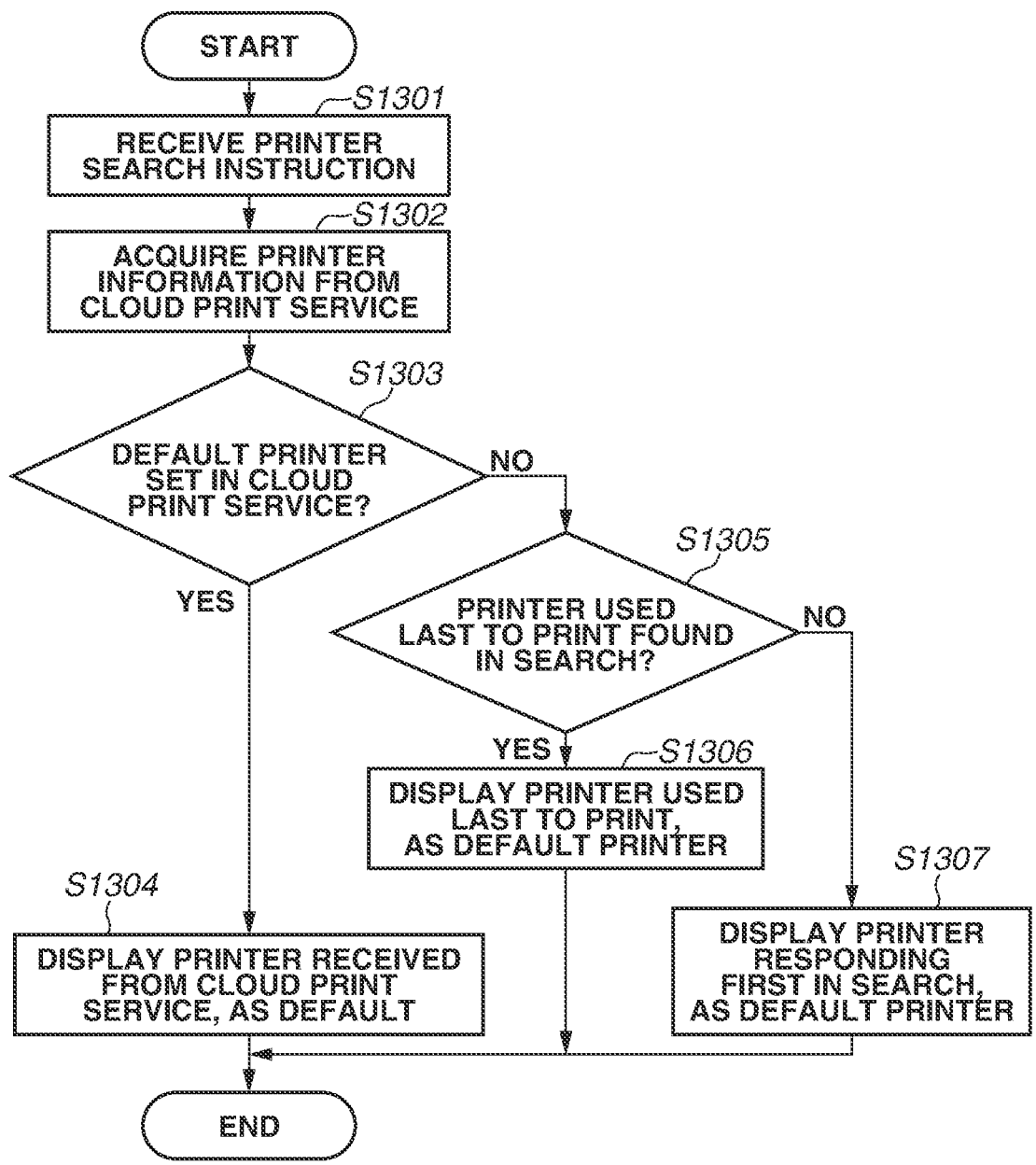
FIG. 13 is a flowchart illustrating an example of processing performed by a client computer according to a third exemplary embodiment.

FIG. 13 is a flowchart illustrating processing of displaying a screen for selecting a printer to be used for printing on the client terminal provided with no setting of a local default printer.

Each piece of processing is performed by the OS 1053 and is implemented by the CPU of the client terminal running a corresponding program.

In step S1301, the OS 1053 receives a printer search instruction and performs printer search processing. The OS 1053 transmits a broadcast search packet and receives a response from a printer existing on the same network as the client terminal.

In step S1302, the OS 1053 accesses and logs into the cloud print service 500, and acquires the printer information associated with the login user. In step S1303, the OS 1053 determines whether a default printer is set on the cloud print service 500. If a default printer is set (YES in step S1303), the processing proceeds to step S1304. In step S1304, the OS 1053 displays the information about the default printer received from the cloud print service 500, as the default printer of the client terminal. If no default printer is registered in the cloud print service 500 (NO in step S1303), the processing proceeds to step S1305. In step S1305, the OS 1053 determines whether the printers found in steps S1301 and S1302 in search include the printer used last to print. If the printer used last to print is found in search (YES in step S1305), the processing proceeds to S1306. In step S1306, the OS 1053 displays the printer used last, as the default printer. If the printer used last to print is not found in search (NO in step S1305), the processing proceeds to S1307. In step S1307, the OS 1053 displays the printer from which a response was received first in search, as the default printer. In step S1307, the OS 1053 may display any of the printers acquired from the cloud print service 500, as the default printer.

Even if the client terminal does not store a local default printer, a default printer registered in the cloud print service 500 can be displayed as the default.

Although, in the description of FIG. 13, the OS 1053 performs the above-described processing, the processing may be performed by an application installed on the client terminal.

A fourth exemplary embodiment will be described. In the fourth exemplary embodiment, some portable client terminals according to the third exemplary embodiment may have an application available to preregister a frequently used printer or an application of this kind installed on them. Such a terminal allows the user to use a preregistered printer found in search on the terminal to print. In the fourth exemplary embodiment, the following will describe the selection of a default printer when the printer information is acquired from the cloud print service 500 on a client terminal provided with the above-described function. The client terminal according to the fourth exemplary embodiment has a hardware configuration similar to that of the client computer illustrated in FIG. 1.

Figure 14:
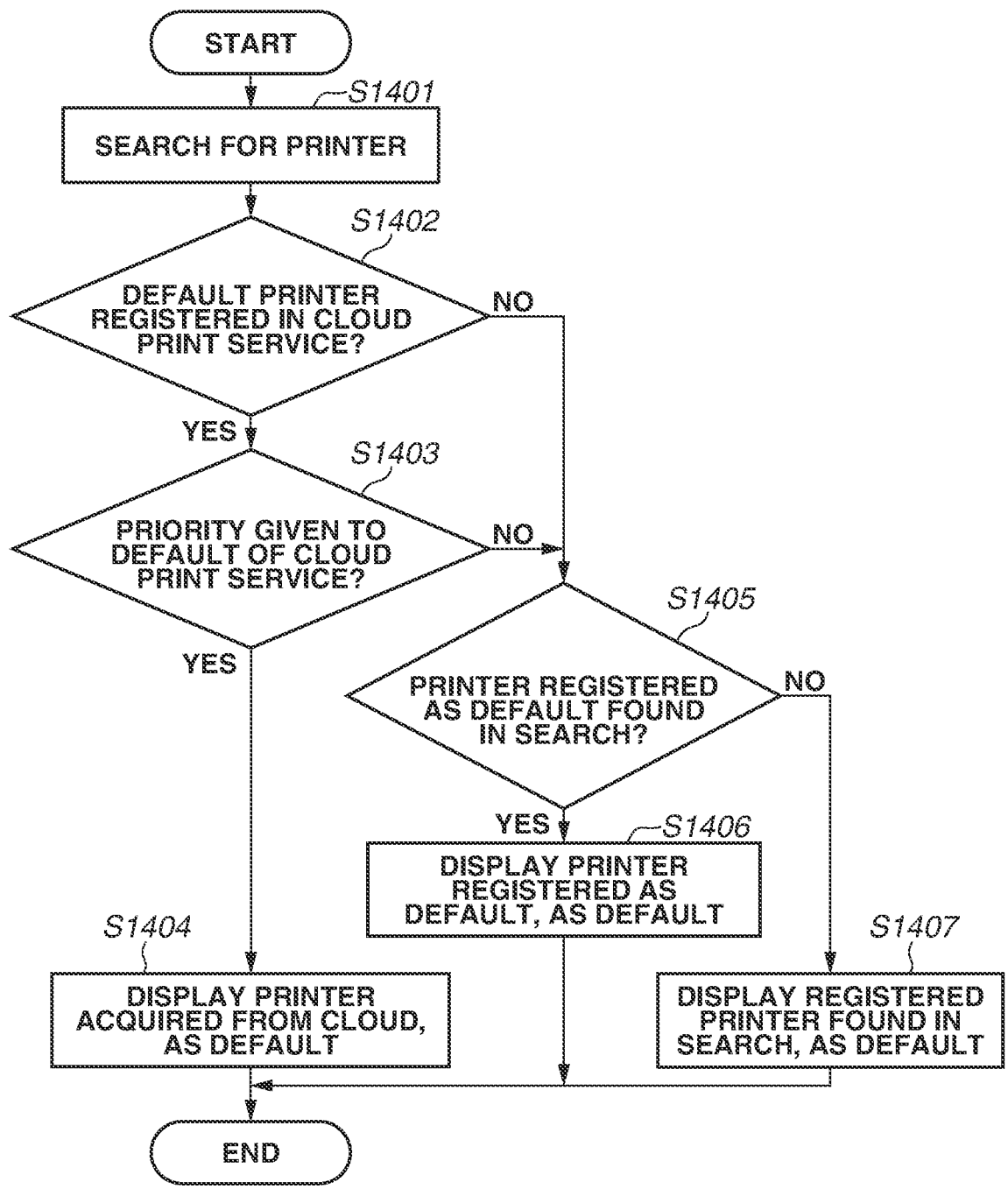
FIG. 14 is a flowchart illustrating an example of processing performed by a client computer according to a fourth exemplary embodiment.

FIG. 14 is a flowchart illustrating processing of setting a default printer on the client terminal according to the fourth exemplary embodiment. Each piece of processing is implemented by the CPU executing a corresponding program.

In step S1401, the CPU searches for a printer. The CPU transmits a search packet on a broadcast basis and receives a response from communicable printers. The CPU further accesses the cloud print service 500 and acquires the information about the printers registered in the cloud print service 500. If the client terminal does not have a token for accessing the cloud print service 500, the CPU acquires the token used by the client terminal to access the cloud print service 500. The CPU displays a screen for prompting the user to input information necessary to log into the cloud print service 500 and, based on the input information, acquires the access token for the cloud print service 500.

In step S1402, the CPU determines whether a default printer is set on the cloud print service 500. If a default printer is set (YES in step S1402), the processing proceeds to step S1403. In step S1403, the CPU performs the processing to be described below. If no default printer is set (NO in step S1402), the processing proceeds to step S1405.

In step S1403, the CPU determines whether the setting is made that allows priority to be given to the default printer to be used of the cloud print service 500. The determination method in step S1403 is similar to that according to the first and the second exemplary embodiments. If the default of the cloud print service 500 is given priority (YES in step S1403), the processing proceeds to step S1404. In step S1404, the CPU displays, as the default, the printer set as the default on the cloud print service 500. If the default of the cloud print service is not given priority (NO in step S1403), the processing proceeds to step S1405. In step S1405, the CPU determines whether the printer registered as the default is found in search by a printer search application.

If the printer set to the default is found in search by the application (YES in step S1405), the processing proceeds to step S1406. In step S1406, the CPU displays the printer as the default printer.

If the printer set to the default is not found by the printer search application (NO in step S1405), the processing proceeds to step S1407. In step S1407, the CPU displays the registered printer responding first in search, as the default.

The above-described processing enables the determination of which printer is to be displayed as the default when the default printer is set on an application installed on the client terminal.

OTHER EXEMPLARY EMBODIMENTS

According to the first and the second exemplary embodiments, at the timing when printer information that can be used by the user is displayed, the OS 1053 acquires the printer information that can be used by the user from the cloud print service 500. Then, the OS 1053 displays the print queue generated in the client computer and the print queue on the cloud print service 500.

A virtual print queue for communicating with the print queue on the cloud print service 500 may be pregenerated on the client computer. In that case, a list of printing apparatuses may be displayed based on the print queue stored in the client computer, instead of acquiring the printer information from the cloud print service 500 in steps S401 and S402 illustrated in FIG. 4 and steps S1100 and S1101 illustrated in FIG. 11.

Embodiments of the present disclosure are also implemented by performing the following processing. More specifically, software (program) for implementing the functions of the above-described exemplary embodiments is fed to a system or apparatus via a network or various types of storage media, and a computer (or CPU or micro processing unit (MPU)) of the system or apparatus reads and executes the program code. In this case, embodiments of the present disclosure include the computer program and the storage medium storing the computer program.

Even if both a default printer for local print and a default printer for cloud print are found, the OS 1053 sets a printer intended by the administrator and/or the user to the default printer.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015845, filed Jan. 31, 2020, which is hereby incorporated by reference herein in its entirety.

What is claimed is:

1. An information processing apparatus to communicate with a server system with which first identifiers of printing apparatuses have been registered and one of the first identifiers is registered as an identifier of a default printing apparatus of the server system, the information processing apparatus comprising:
a controller configured to:
store second identifiers of printing apparatuses to which the information processing apparatus transmits print data without using the server system;
set, as an identifier of a default printing apparatus of the information processing apparatus, one of the second identifiers stored in the information processing apparatus;
acquire, from the sever system, the first identifiers registered with the server system and said one of the first identifiers registered with the server system as the identifier of the default printing apparatus of the server system;
select, based on a setting of the information processing apparatus, an identifier of a default printing apparatus for display from among the acquired identifier of the default printing apparatus of the server system and the stored identifier of the default printing apparatus of the information processing apparatus; and
cause a display unit to display an object for selecting an identifier of a printing apparatus for printing from among the first identifiers of the printing apparatuses registered with the server system and the second identifiers of the printing apparatus stored in the information processing apparatus, wherein the selected identifier of the default printing apparatus for display is displayed as an initial value.

2. The information processing apparatus according to claim 1, wherein the controller is further configured to:
receive a user operation for setting the identifier of the default printing apparatus of the server system as the default printing apparatus for display, wherein the controller selects the identifier of the default printing apparatus of the server system as the identifier of the default printing apparatus for display based on the received user operation.

3. The information processing apparatus according to claim 2, wherein the controller is further configured to:
notify that the default printing apparatus of the server system has been set as the default printing apparatus for display to the sever system.

4. The information processing apparatus according to claim 1, wherein the controller is further configured to:
transmit print data to the server system, in a case that an identifier of the printing apparatus selected via the object is an identifier of a printing apparatus which has been registered with the server system.

5. The information processing apparatus according to claim 1, wherein the controller is further configured to:
search for printing apparatuses that are able to communicate without using the server system, wherein the printing apparatuses registered with the information processing apparatus are printing apparatuses detected by the search.

6. A method of controlling an information processing apparatus to communicate with a server system with which first identifiers of printing apparatuses have been registered and one of the first identifiers is registered as an identifier of a default printing apparatus of the server system, the method comprising:
storing second identifiers of printing apparatuses to which the information processing apparatus transmits print data without using the server system;
setting, as an identifier of a default printing apparatus of the information processing apparatus, one of the second identifiers stored in the information processing apparatus;
acquiring, from the sever system, the first identifiers registered with the server system and said one of the first identifiers registered with the server system as the identifier of the default printing apparatus of the server system;
selecting, based on a setting of the information processing apparatus, an identifier of a default printing apparatus for display from among the acquired identifier of the default printing apparatus of the server system and the stored identifier of the default printing apparatus of the information processing apparatus; and causing a display unit to display an object for selecting an identifier of a printing apparatus for printing from among the first identifiers of the printing apparatuses registered with the server system and the second identifiers of the printing apparatus stored in the information processing apparatus, wherein the selected identifier of the default printing apparatus for display is displayed as an initial value.

7. A non-transitory storage medium storing a program for a method of controlling an information processing apparatus to communicate with a server system with which first identifiers of printing apparatuses have been registered and one of the first identifiers is registered as an identifier of a default printing apparatus of the server system, the method comprising:

storing second identifiers of printing apparatuses to which the information processing apparatus transmits print data without using the server system;

setting, as an identifier of a default printing apparatus of the information processing apparatus, one of the second identifiers stored in the information processing apparatus;

acquiring, from the sever system, the first identifiers registered with the server system and said one of the first identifiers registered with the server system as the identifier of the default printing apparatus of the server system;

selecting, based on a setting of the information processing apparatus, an identifier of a default printing apparatus for display from among the acquired identifier of the default printing apparatus of the server system and the stored identifier of the default printing apparatus of the information processing apparatus; and causing a display unit to display an object for selecting an identifier of a printing apparatus for printing from among the first identifiers of the printing apparatuses registered with the server system and the second identifiers of the printing apparatus stored in the information processing apparatus, wherein the selected identifier of the default printing apparatus for display is displayed as an initial value.

8. The information processing apparatus according to claim 2, wherein the controller is further configured to:

receive another user operation for setting the default printing apparatus of the information processing apparatus as the default printing apparatus for display, wherein the controller selects the identifier of the default printing apparatus of the information processing apparatus as the identifier of the default printing apparatus for display based on the received another user operation.

9. The information processing apparatus according to claim 4, wherein the controller is further configured to:

transmit the print data to a printing apparatus, in a case that an identifier of the printing apparatus selected via the object is an identifier of a printing apparatus which has been stored in the information processing apparatus.

10. The information processing apparatus according to claim 1, wherein the controller is further configured to:

select the default printing apparatus of the server system as the default printing apparatus for display, in a case that the default printing apparatus of the information processing apparatus has not been set.

11. The information processing apparatus according to claim 1, wherein the controller is further configured to:

select a printing apparatus detected by a search executed by the information processing apparatus as the default printing apparatus for display, in a case that the controller is not able to detect the default printing apparatus of the information processing apparatus by the search executed by the information processing apparatus.

12. The information processing apparatus according to claim 1, wherein the identifier is a name of a printing apparatus.

* * * * *